United States Patent
Takeda et al.

(10) Patent No.: US 6,973,076 B2
(45) Date of Patent: Dec. 6, 2005

(54) MOBILE COMMUNICATION NETWORK, TERMINAL EQUIPMENT, PACKET COMMUNICATION CONTROL METHOD, AND GATEWAY

(75) Inventors: Yukiko Takeda, Tokorozawa (JP); Hidenori Inouchi, Higashimurayama (JP); Takumi Oishi, Yokohama (JP); Haruo Shibata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 883 days.

(21) Appl. No.: 09/854,665

(22) Filed: May 15, 2001

(65) Prior Publication Data

US 2001/0048686 A1  Dec. 6, 2001

(30) Foreign Application Priority Data

May 17, 2000  (JP)  ............ P2000-149808

(51) Int. Cl.[7] ............................ H04L 12/66
(52) U.S. Cl. .............. 370/356; 370/401; 370/475
(58) Field of Search ............... 370/310, 351, 370/356, 389, 400, 401, 412

(56) References Cited

U.S. PATENT DOCUMENTS 6,636,502 B1 * 10/2003 Lager et al. ............... 370/352

FOREIGN PATENT DOCUMENTS

WO  WO 99/37103  * 7/1999  ............ H04Q 7/22

OTHER PUBLICATIONS

Stallings, W. "IPv6: The New Internet Protocol". IEEE. pp. 96-108. Jul. 1996.*
Deering et al., Internet Protocol, Version 6 (IPv6) Specification, http://www.ietf.org/rfc/rfc2460.txt?number=2460, Dec. 1998, pp. 1-34.

* cited by examiner

Primary Examiner—Ricky Ngo
Assistant Examiner—Derrick W. Ferris
(74) Attorney, Agent, or Firm—Reed Smith LLP; Stanley P. Fisher, Esq.; Juan Carlos A. Marquez, Esq.

(57) ABSTRACT

An IPv6 mobile packet communication network in which mobile VPN service can be provided without having to use a mobile tunnel. A control signal for enabling packet data transmission and reception is sent from a mobile terminal to a gateway node. Using destination-of-connection information contained in the control signal, the gateway node checks whether mobile VPN service is requested or not. Upon detection of a mobile VPN service request, the gateway node returns IP address information of the gateway node to the mobile terminal via a subscriber node. The mobile terminal then assembles an IPv6 header (210) and an IPv6 routing header (220) so that packet data will be unexceptionally transferred through the gateway node.

7 Claims, 7 Drawing Sheets

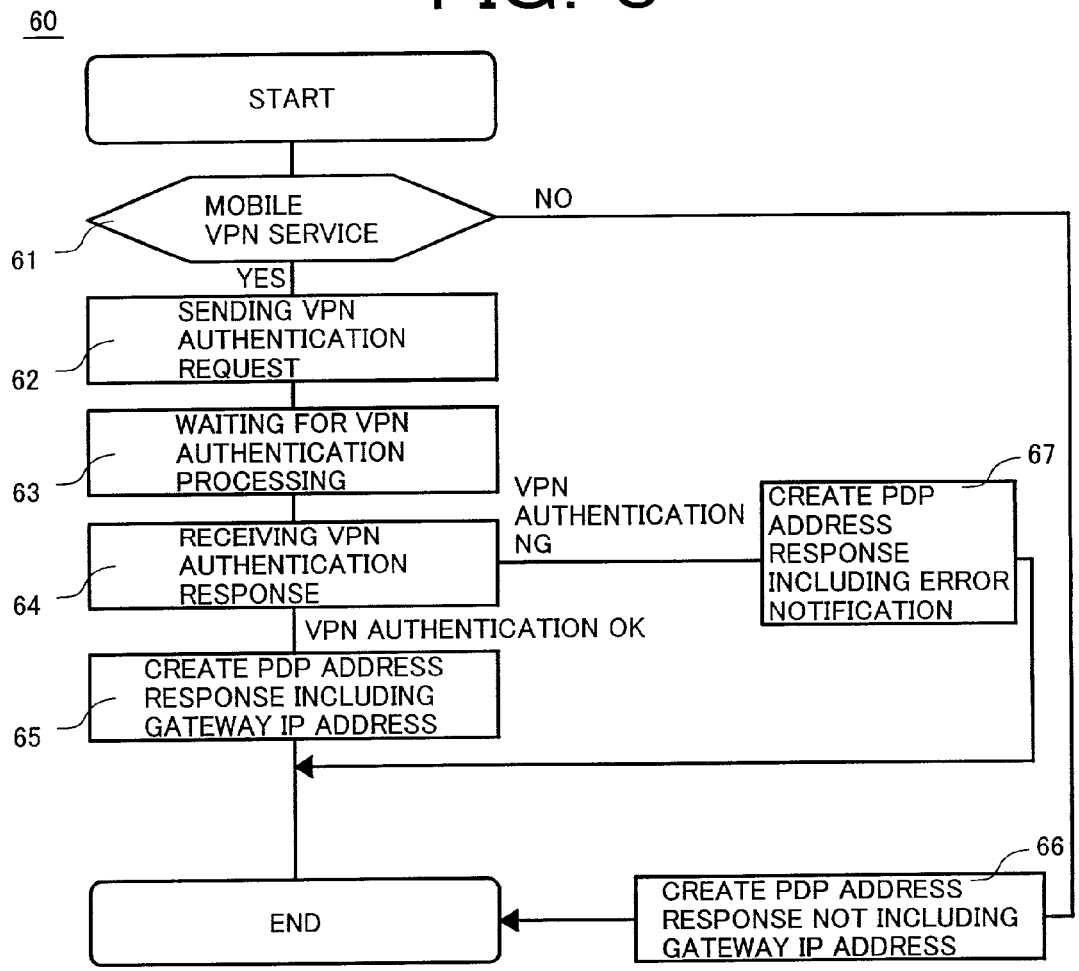

MOBILE COMMUNICATION NETWORK, TERMINAL EQUIPMENT, PACKET COMMUNICATION CONTROL METHOD, AND GATEWAY

BACKGROUND OF THE INVENTION

1. Field of the Invention

The present invention relates to a packet transfer method in an IPv6 mobile packet communication network, and more particularly to a method of providing mobile VPN (Virtual Private Network) service in an interconnection arrangement of an IPv6 mobile packet communication network and an IP-based network.

2. Description of Related Art

Recent years have seen rapid proliferation of Internet and mobile communication services.

Communications over the Internet are carried out by transmitting IP packets according to the de facto standard IP protocol (Internet Protocol, RFC 791). To each equipment connected to the Internet, an IP address unique in itself is assigned for identification thereof, and IP packet routing is performed using each unique IP address.

Upon receipt of an IP packet, a node apparatus checks a destination IP address contained in a header of the IP packet. If a terminal having the destination IP address is not found in the node apparatus, the IP packet is transferred to a node adjacent thereto using a routing table which provides correspondence relationships of IP addresses and adjacent nodes.

It is anticipated that the number of IPv4 addresses used at present on the Internet will become insufficient with further widespread use of the Internet. To cope with this situation, intensive studies have been made of a new addressing scheme called IPv6 (Internet Protocol, Version-6 Specification, RFC 2460).

According to the IPv6 addressing scheme, a variety of functions can be defined in an IPv6 extension header, which is inserted between an IPv6 header and a payload part. A routing header is provided as a kind of IPv6 extension header. With the use of a routing header, a packet sender can specify an intermediate node through which packet data is to be transferred.

Particular attention has recently been focused on VPN (Virtual Private Network) service using the Internet. The VPN service includes inter-LAN connection VPN service and remote access VPN service. In the inter-LAN connection VPN service, the Internet is used for a LAN-to-LAN connection. The remote access VPN service allows a user on the road to make access to enterprise network equipment. In the remote access VPN service, communication is set up between an apparatus having a VPN access function and enterprise VPN equipment through the Internet. More specifically, the user on the road can connect to the apparatus having the VPN access function by means of a dialup connection, for example.

In communication between the apparatus having the VPN access function and the VPN equipment, tunneling is performed for the purpose of ensuring the security of information. Upon receiving an IP packet from the user on the road, the apparatus having the VPN access function adds a header addressed to the VPN equipment to the received IP packet (encapsulation), and the IP packet thus encapsulated is transmitted to the VPN equipment. At the VPN equipment, the added header is stripped off (decapsulation) to provide the original IP packet. Then, the VPN equipment sends the original IP packet to a destination indicated in a destination address field of a header thereof. A tunnel used in VPN communication is referred to as a VPN tunnel. For VPN tunneling, the L2TP (Layer Two Tunneling Protocol, RFC 2661) is available, for example.

In today's mobile communication services, the ratio of data communication is increasing significantly. For providing efficient data communication, considerable research has been conducted on mobile packet communication networks. Examples of mobile packet communication network service include PDC-P (Personal Digital Cellular-Packet) and GPRS (General Packet Radio Service). In the third-generation mobile communication system IMT-2000, it is planned to provide superfast packet communication service. At present, as an upper-layer protocol for mobile packet communication networking, the IP (Internet Protocol) is in widespread use.

To implement communication service using the IP protocol in a mobile packet communication network, it is required for each common carrier to allocate IP addresses to mobile terminals. Since the number of mobile terminals is increasing rapidly and the number of IPv4 addresses is becoming insufficient, IPv6 addresses would be allocated to mobile terminals.

In general, a mobile communication network comprises a radio access network and a core network. The radio access network includes a base station and a base station controller, and the core network includes a subscriber node and a gateway node.

Mobile communication network operations are categorized into the following three types; communication originated from a mobile terminal and terminated to a fixed terminal, communication originated from a fixed terminal and terminated to a mobile terminal, and communication originated from a mobile terminal and terminated to a mobile terminal.

The following describes a packet communication procedure for communication originated from a mobile terminal and terminated to a mobile terminal in a GPRS-based scheme as an example.

In the GPRS-based scheme for mobile packet communication, each mobile terminal registers its current location information in the mobile packet communication network. Then, using a GPRS signaling procedure, a control signal is transmitted between an originating mobile terminal and a gateway node so that the originating mobile terminal can send and receive packet data. Thereafter, the originating mobile terminal sends IP packets to a destination mobile terminal.

Each IP packet addressed from the originating mobile terminal to the destination mobile terminal is routed through a subscriber node in the current location area (visiting area) where the originating mobile terminal is currently located. At the subscriber node in the current location area of the originating mobile terminal, a header addressed to an origination home gateway node is added to each received IP packet (encapsulation), and then the IP packet thus encapsulated is forwarded to the origination home gateway node. Upon receiving the encapsulated IP packet, the origination home gateway node removes the added header (decapsulation) to attain the original IP packet. Using an IP address of the destination mobile terminal which is contained as a destination address in the original IP packet header, the origination home gateway node identifies a destination home gateway node corresponding to the destination mobile terminal. Then, the origination home gateway node transfers the IP packet to the destination home gateway node. Upon receipt of the IP packet from the origination home gateway node, the destination home gateway node identifies a subscriber node in the current location area (visiting area) where the destination mobile terminal is currently located, using the destination address contained in the IP packet header. Then, the destination home gateway node encapsulates the IP packet again and sends the encapsulated IP packet to the subscriber node corresponding to the destination mobile terminal. At the subscriber node, the received IP packet is decapsulated to attain the original IP packet, which is then transmitted to the destination mobile terminal. Through the above-mentioned processing, each IP packet from the originating mobile terminal reaches the destination mobile terminal.

A section between a point where each IP packet is encapsulated and a point where the encapsulated IP packet is decapsulated to attain the original IP packet is referred to as a tunnel, and a tunnel used in mobile communication networking is referred to as a mobile tunnel. The mobile tunnel is required for tracking the current location of each mobile user terminal.

In the IETF (Internet Engineering Task Force), mobile IP specifications conforming to the IPv6 addressing scheme are under study. According to the current version of mobile IPv6 specifications, an originating terminal sends packet data to a home address which has been allocated to a destination mobile terminal by a service provider thereof. Then, a home agent corresponding to the destination mobile terminal receives each IP packet directed to the home address. At the home agent, a header containing the current location area address of the destination mobile terminal is added to the received IP packet, which is then transferred to the destination mobile terminal. The current location area address is an IP address dynamically allocated in a network area where each mobile terminal is currently located.

Upon receiving the IP packet, the destination mobile terminal sends a control signal containing the current location area address information of the destination mobile terminal to the originating terminal. Then, the originating terminal stores the current location area address information of the destination mobile terminal contained in the control signal. While the current area address information of the destination mobile terminal is retained in the originating terminal, the originating terminal can use the current location address information of the destination mobile terminal in subsequent packet transmission to the destination mobile terminal.

It is expected that the mobile VPN service will be a mainstay of the third-generation mobile communication system IMT-2000. The mobile VPN service is to be implemented in a form of remote access VPN service which allows a user on the road to make access to enterprise network equipment. In the mobile VPN service, communication is set up between an originating mobile terminal and a destination fixed terminal.

For providing the mobile VPN service, a gateway node in a mobile packet communication network is equipped with a VPN access server function as disclosed in Japanese Patent Application No. 2000-97813. In the mobile VPN service, a VPN tunnel is used for communication between the gateway node having the VPN access server function and VPN equipment. It is therefore necessary to transfer packet data from a mobile terminal through the gateway node having the VPN access server function which has been accessed at the start of communication.

In a conventional mobile packet communication network, a mobile tunnel is used for communication between a subscriber node and a gateway node. The subscriber node and gateway node perform packet encapsulation and decapsulation processing. Due to the packet encapsulation and decapsulation processing, a workload on the subscriber node and gateway node increases to cause a decrease in throughput of the mobile packet communication network.

In cases where a mobile tunnel is not used, each IP packet sent from a mobile terminal is routed according to an IP header thereof. Therefore, the IP packet is not always transferred through a gateway node at which VPN tunneling for the communication of interest has been established. When the IP packet is not transferred though the gateway node, the mobile VPN service becomes unavailable to the users concerned.

SUMMARY OF THE INVENTION

It is therefore an object of the present invention to obviate the above-mentioned disadvantages by providing a novel packet communication control method for IPv6 mobile packet communication networking. In accomplishing this object of the present invention and according to one aspect thereof, there is provided a packet communication control method in which packet data is transferred using an IPv6 routing header. At a gateway node, a control signal available in a mobile packet communication network is used to send information necessary for generating a routing header to a mobile terminal.

Each mobile terminal registers its current location information in the mobile packet communication network. Then, an originating terminal sends a control message (Activate PDP Context Request) to a subscriber node to enable transmission and reception of packet data. Upon receiving this control message, the subscriber node identifies a gateway node using its APN (Access Point Name) At the subscriber node, an APN is acquired by either of the following means: Where the destination of connection from a mobile terminal is invariable, an APN is stored in a mobile-service control point (M-SCP). At the time of location registration of the mobile terminal, the subscriber node reads the APN out of the M-SCP. Where the destination of connection from a mobile terminal is variable, an APN input by a user of the mobile terminal is set up as an APN parameter in the control message "Activate PDP Context Request".

The subscriber node sends a control message (Create PDP Context Request) to the identified gateway node so that the mobile terminal can send and receive packet data. In this control message, an APN parameter is contained without exception. Upon receiving this control message, the gateway node identifies a destination-of-connection external network using the APN parameter contained in the received control message.

In the gateway node, there is provided first service control means for detecting a mobile VPN service request in the APN parameter. For the use of mobile VPN service, the gateway node sends a response message containing an IP address thereof (Create PDP Context Response) to the subscriber node.

In the subscriber node, there is provided second service control means for sending a message "Activate PDP Context Accept" containing the IP address of the gateway node to the mobile terminal upon receipt of the message "Create PDP Context Response" containing the IP address of the gateway node.

If the subscriber node receives a response message not containing the IP address of the gateway node from the gateway node, the subscriber node does not notify the mobile terminal of the gateway node IP address.

In the mobile terminal, there is provided third service control means for using an IPv6 routing header in packet transmission when the response message containing the gateway node IP address is received from the subscriber node. The mobile terminal assembles an IPv6 header and IPv6 routing header so that packet data will be unexceptionally transferred through the gateway node at which VPN tunneling for the communication of interest has been established. Using the IPv6 routing header, a packet sender can specify the gateway node as an intermediate node through which packet data is to be transferred.

If the mobile terminal receives the response message not containing the gateway node IP address from the subscriber node, the mobile terminal does not use the IPv6 routing header in packet transmission.

That is to say, on receipt of the response message not containing the gateway node IP address, the mobile terminal does not specify a transfer route in packet transmission. In this case, packet data from the mobile terminal is transferred according to routing table information held in each node. Therefore, each packet from the mobile terminal is not always transferred through a specific gateway node. Where the mobile terminal does not use mobile VPN service, it is not necessary to transfer packet data from the mobile terminal through a specific gateway node, causing no problem in packet transmission.

When the gateway node receives each IP packet containing the IPv6 routing header, the gateway node processes the IPv6 routing header. Then, the gateway node attaches an additional header for VPN tunneling to the received IP packet, and sends the IP packet having the additional header to VPN equipment.

In a case where a mobile terminal uses an IPv6 routing header in packet transmission, the mobile terminal can specify a particular gateway node at which VPN tunneling for the communication of interest has been established. This makes it possible to provide mobile VPN service to mobile terminal users without having to use a mobile tunnel.

According to the present invention, there is provided a mobile packet communication network including the above-mentioned three service control means, wherein mobile VPN service is available to mobile terminal users without using a mobile tunnel.

Furthermore, in the mobile packet communication network according to the present invention, a network provider can provide efficient communication service by making use of IPv6 functions.

Other and further objects, features and advantages of the invention will appear more fully from the following description.

BRIEF DESCRIPTION OF THE DRAWINGS

A preferred form of the present invention illustrated in the accompanying drawings in which:

FIG. 3 is a flowchart of a VPN decision processing routine to be executed at the gateway node for detecting a mobile VPN service request;

FIG. 4 is a diagram showing a structure of a user information management table held in the gateway node;

DETAILED DESCRIPTION OF THE PREFERRED EMBODIMENTS

A first preferred embodiment of the present invention will now be described in detail by way of example with reference to the accompanying drawings.

Figure 1:
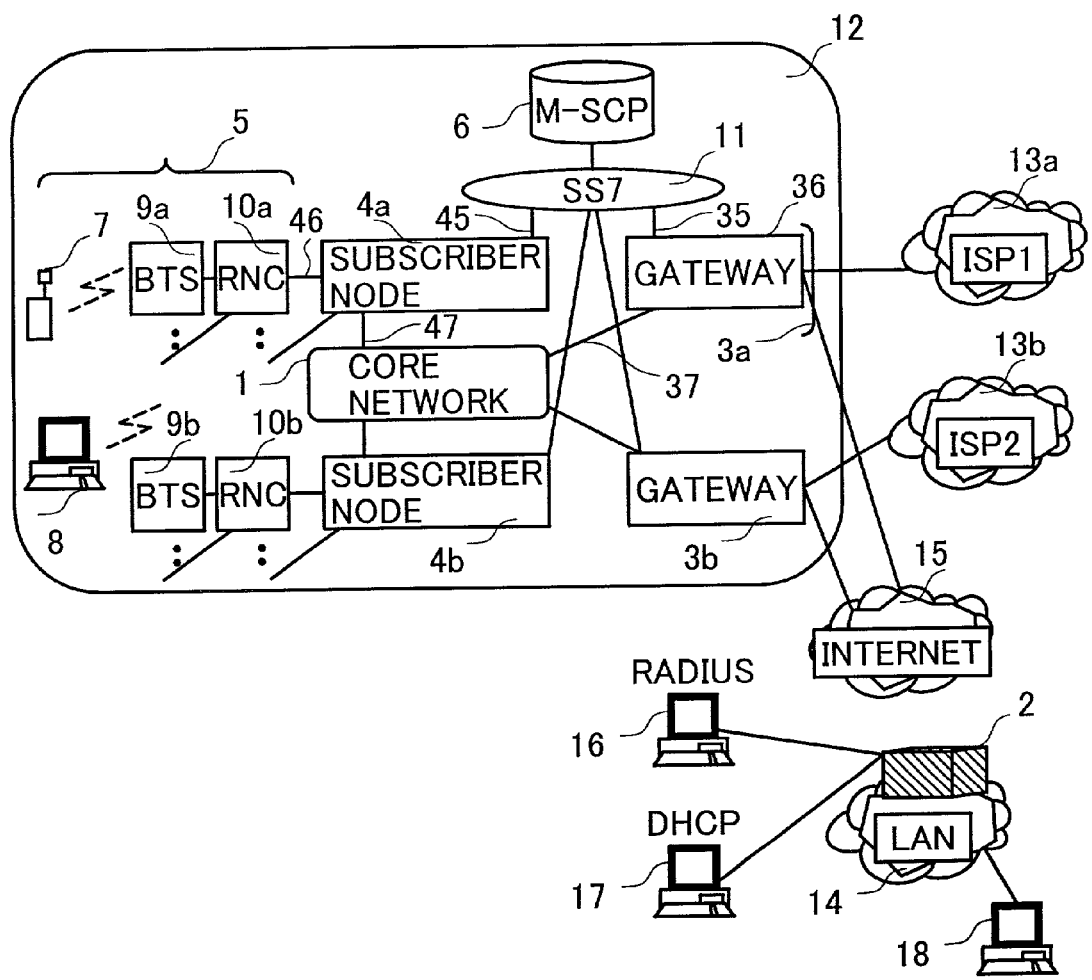
FIG. 1 is a diagram showing an example of a mobile packet communication network configuration.

Referring to FIG. 1, there is shown an exemplary configuration of a network for supporting mobile VPN service according to the present invention.

The network for supporting mobile VPN service comprises a mobile packet communication network 12, the Internet 15, and a LAN 14. In the present invention, IPv6 addresses are used for the mobile packet communication network 12 and the LAN 14.

The mobile packet communication network 12 comprises a radio access network 5 and a core network 1.

The core network 1 in the mobile packet communication network 12 includes a plurality of subscriber nodes 4 and a plurality of gateway nodes 3. These subscriber nodes 4 and gateway nodes 3 are connected to a mobile-service control point (M-SCP) 6 through a common signaling network 11 (Signaling System No. 7).

Each gateway node 3 is provided with means for carrying out Internet protocol communication with networks other than the mobile packet communication network 12, such as an ISP 13 and the Internet 15. In the gateway node 3b, there is provided with a VPN access server function which allows access to VPN equipment 2 on the LAN 14.

The radio access network 5 in the mobile packet communication network 12 includes a plurality of base transceiver stations (BTSS) 9 (9a, 9b) and a plurality of radio network controllers (RNCs) 10 (10a, 10b).

The M-SCP 6 is provided with subscriber information, terminal location information, and software programs for additional services to subscribers.

The LAN 14 is connected with the VPN equipment 2 and a server 18 for providing various information. Besides, the LAN 14 may be connected with a RADIUS (Remote Authentication Dial In User Service) server 16 and a DHCP (Dynamic Host Configuration Protocol) server 17.

The VPN equipment 2 is provided with means for communicating with the Internet 15 using the Internet protocol.

Figure 2:
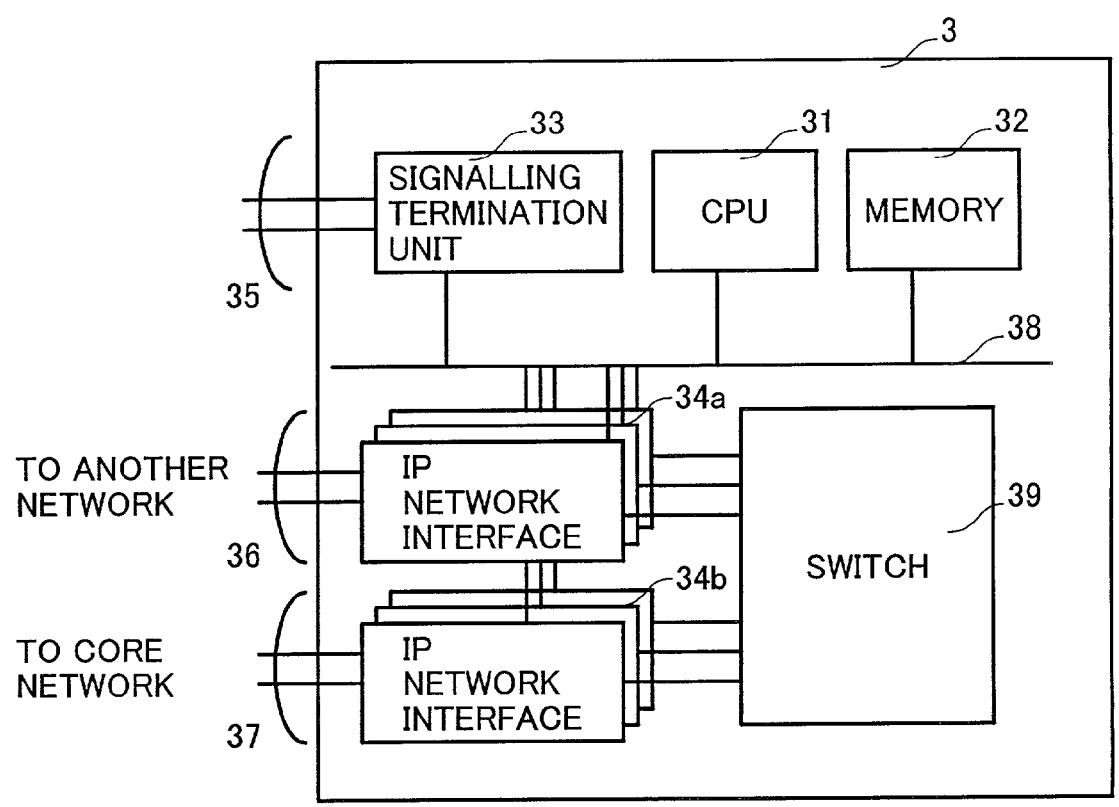
FIG. 2 is a diagram showing a configuration of a gateway node.

Referring to FIG. 2, there is shown a configuration of the gateway node 3. The gateway node 3 comprises a CPU 31 for controlling signals to be interchanged with the subscriber node 4 and other networks, a memory 32, a signaling termination unit 33 for terminating a signal line 35 from the common signaling network 11, and an IP network interface 34 (34a, 34b) for terminating a signal line 36 from another IP network and a signal line 37 from another node in the core network 1. These components in the gateway node 3 are interconnected through a bus 38.

Communication between the CPU 31 and the subscriber node 4 or another network is carried out using the Internet protocol, for example.

The memory 32 contains a program for interchanging signals with equipment on another IP network or equipment on the core network 1, a program for generating, correcting or deleting control information to be used by a mobile terminal for packet communication, a program for performing a VPN access server function to make access to the VPN equipment 2 on the LAN 14, a VPN decision processing routine 60 for detecting a mobile VPN service request shown in FIG. 3, and a user information management table 300 shown in FIG. 4.

A switch 39 in the gateway node 3 is connected with the IP network interface 34 for providing a switching function in the gateway node 3.

Referring to FIG. 4, there is shown a structure of the user information management table 300. This table contains a plurality of entries (300-1 to 300-n) generated for each mobile packet communication network subscriber identifier (IMSI) 301. In each entry corresponding to each IMSI 301, there are defined an IP address 302, an IP address 303 of a subscriber node in a terminal location area, a VPN flag 304 indicating the use of mobile VPN service, a VPN tunnel identifier 305 for identifying a VPN tunnel established between the gateway node and VPN equipment, and a VPN session identifier 306.

Figure 7:
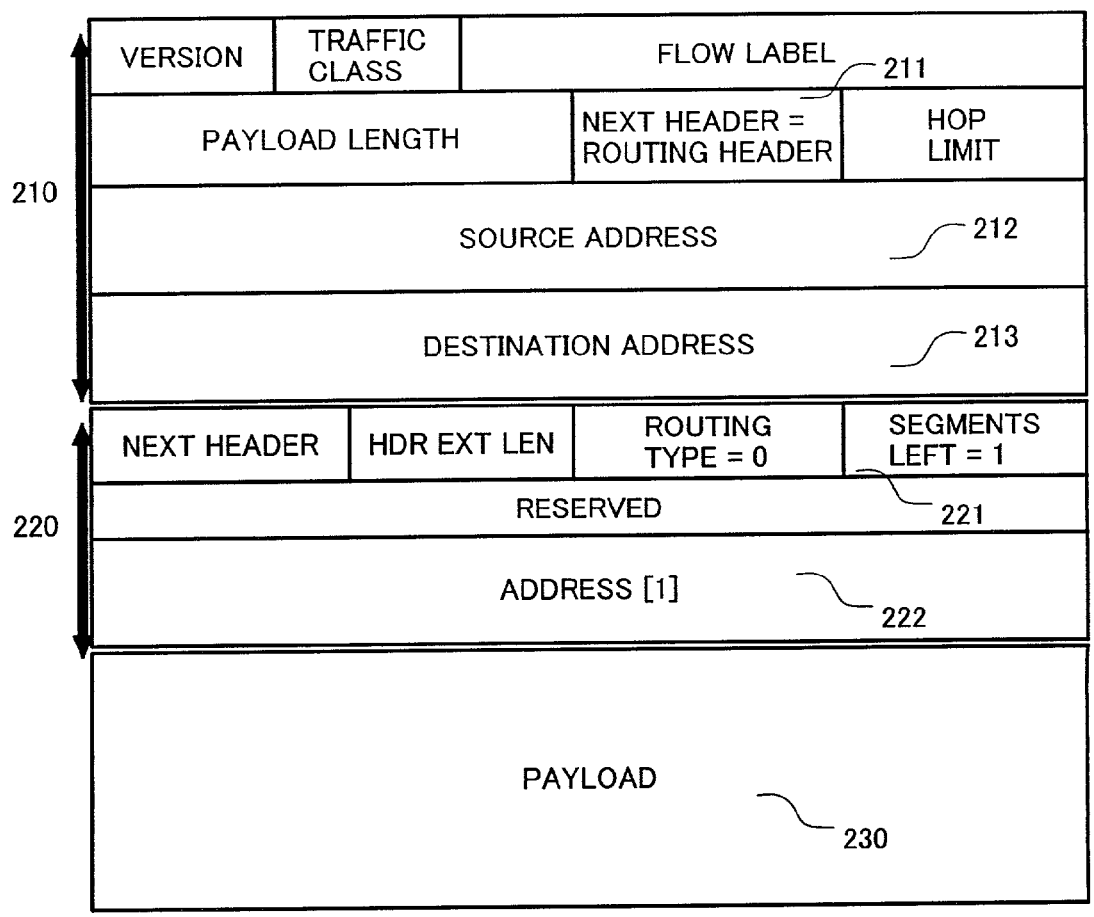
FIG. 7 is a diagram showing a format for an IPv6 packet to be transmitted from each mobile terminal to the gateway node.

Referring to FIG. 7, there is shown a format for an IPv6 packet 200 to be transmitted between a terminal (7, 8) and the gateway node 3. The IPv6 packet 200 contains an IPv6 header 210, an IPv6 extension header 220, and a payload 230. In the IPv6 packet 200, any kind of IPv6 extension header 220 can be inserted after the IPv6 header 210. In the present invention, a routing header is used as an IPv6 extension header. That is to say, a packet format having the routing header as an IPv6 extension header is adopted as shown in FIG. 7.

The IPv6 header 210 contains the following fields; a version number, a traffic class, a flow label, a payload length, a next header type 211, a hop limit, a source address 212, and a destination address 213. The next header type 211 indicates a header following the IPv6 header. Where the payload 230 contains an upper-layer protocol data unit (PDU), the next header type 211 indicates a protocol number of the upper-layer protocol concerned. Where the IPv6 header is followed by the IPv6 extension header, the next header type 211 indicates a value representing the kind of IPv6 extension header.

In the field of the destination address 213, an IPv6 address of the final destination is set up under normal conditions. Where the routing header is used, an address of a node to be used next for packet transfer is set up in the field of the destination address 213 instead of the final destination address.

The routing header contains the following fields; a next header type, a header length, a routing type, a segment left 221, and an address 222. The segment left 221 indicates the number of intermediate nodes still to be visited before reaching the final destination. The address 222 indicates an address of an intermediate node to be used for packet transfer. A plurality of intermediate node addresses may be set up in the field of the address 222.

According to the present invention, in each IP packet sent from a mobile terminal using mobile VPN service, the next header type 211 in the IPv6 header 210 indicates a routing header type, the source address 212 indicates a terminal IP address, and the destination address 213 indicates a gateway node IP address. An IP address of a destination-of-transfer node (server) 18 specified by the mobile terminal is set up in the field of the address 222 in the routing header, and "1" is set up in the field of the segment left 221 therein.

Figure 8:
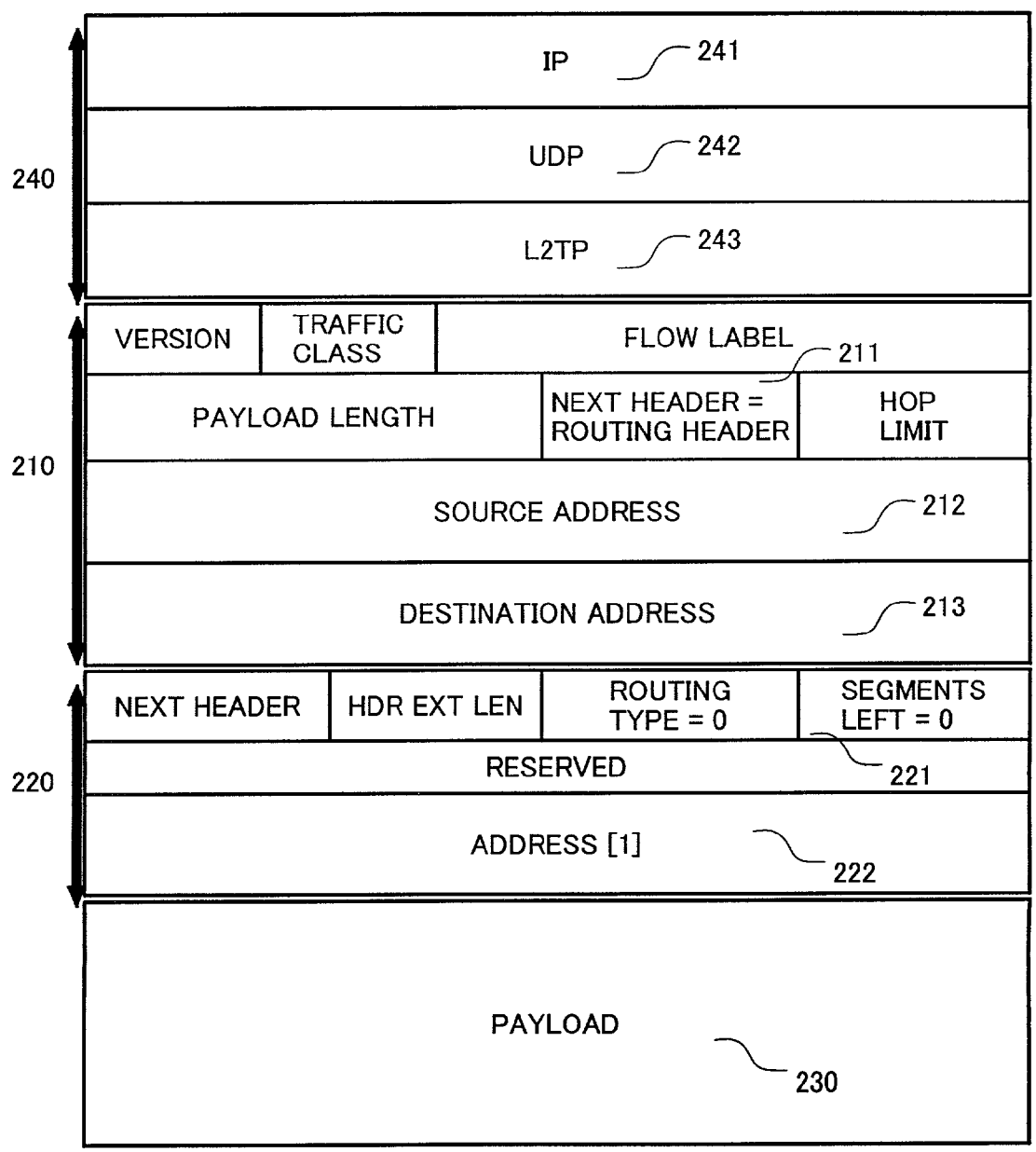
FIG. 8 is a diagram showing a format for an IP packet to be transferred from the gateway node to VPN equipment.

Referring to FIG. 8, there is shown a packet format 250 for packet transfer using L2TP-based VPN tunneling between the gateway node 3 and VPN equipment 2.

At the gateway node 3, a VPN tunneling header 240 (containing an IP header 241, UDP header 242, and L2TP header 243) is added to each IPv6 packet 200 received from a mobile terminal.

In packet transmission from the gateway node 3 to the VPN equipment 2, the gateway node 3 sets up information in the VPN tunneling header 240 as mentioned below: An IP address of the VPN equipment 2 is set up as a destination address in the IP header 241, and an IP address of the gateway node 3 is set up as a source address therein. In the UDP header 242, a destination port number "1701" is set up to indicate that a destination-of-data application is based on "L2TP". In the L2TP header 243, an identifier for identifying a VPN tunnel and an identifier for identifying a session in the VPN tunnel are set up.

Referring to FIG. 3, there is shown a flowchart of a VPN decision processing routine 60 for detecting a mobile VPN service request. This routine is executed when the gateway node 3 receives a message "Create PDP Context Request" from the subscriber node 4.

In execution of the VPN decision processing routine 60, an APN which is unexceptionally contained in the above message received by the gateway node 3 is read out to check whether mobile VPN service is requested or not (step 61).

If it is found that mobile VPN service is requested, the gateway node 3 sends a VPN authentication request to the RADIUS server 16 connected with the LAN 14, for example, in order to judge whether VPN service access is allowed or not (step 62). Then, the gateway node 3 waits for completion of VPN authentication processing (step 63).

Upon receipt of a VPN authentication response, the gateway node 3 checks whether the VPN authentication processing has come to a normal end or not (step 64). If it is found that the VPN authentication processing has come to a normal end, the gateway node 3 sends the message "Create PDP Context Response" including its own IP address to the subscriber node 4 (step 65). Then, the execution of this routine is terminated. If it is found that the VPN authentication processing has come to an abnormal end, the gateway node 3 sends a response including an error notification to the subscriber node 4 (step 67). Then, the execution of this routine is terminated.

At step 61, if a mobile VPN service request is not detected, the gateway node 3 sends a response not including its own IP address to the subscriber node 4 (step 66). Then, the execution of this routine is terminated.

When the subscriber node 4 receives a signal containing the IP address of the gateway node 3, a message "Activate PDP Context Accept" including the IP address of the gateway node 3 is sent from the subscriber node 4 to the mobile terminal concerned.

When the subscriber node 4 receives a signal not containing the IP address of the gateway node 3, the message "Activate PDP Context Accept" not including the IP address of the gateway node 3 is sent from the subscriber node 4 to the mobile terminal concerned.

If the subscriber node 4 receives a signal containing an error notification, a message "Activate PDP Context Reject" is sent from the subscriber node 4 to the mobile terminal concerned.

Figure 5:
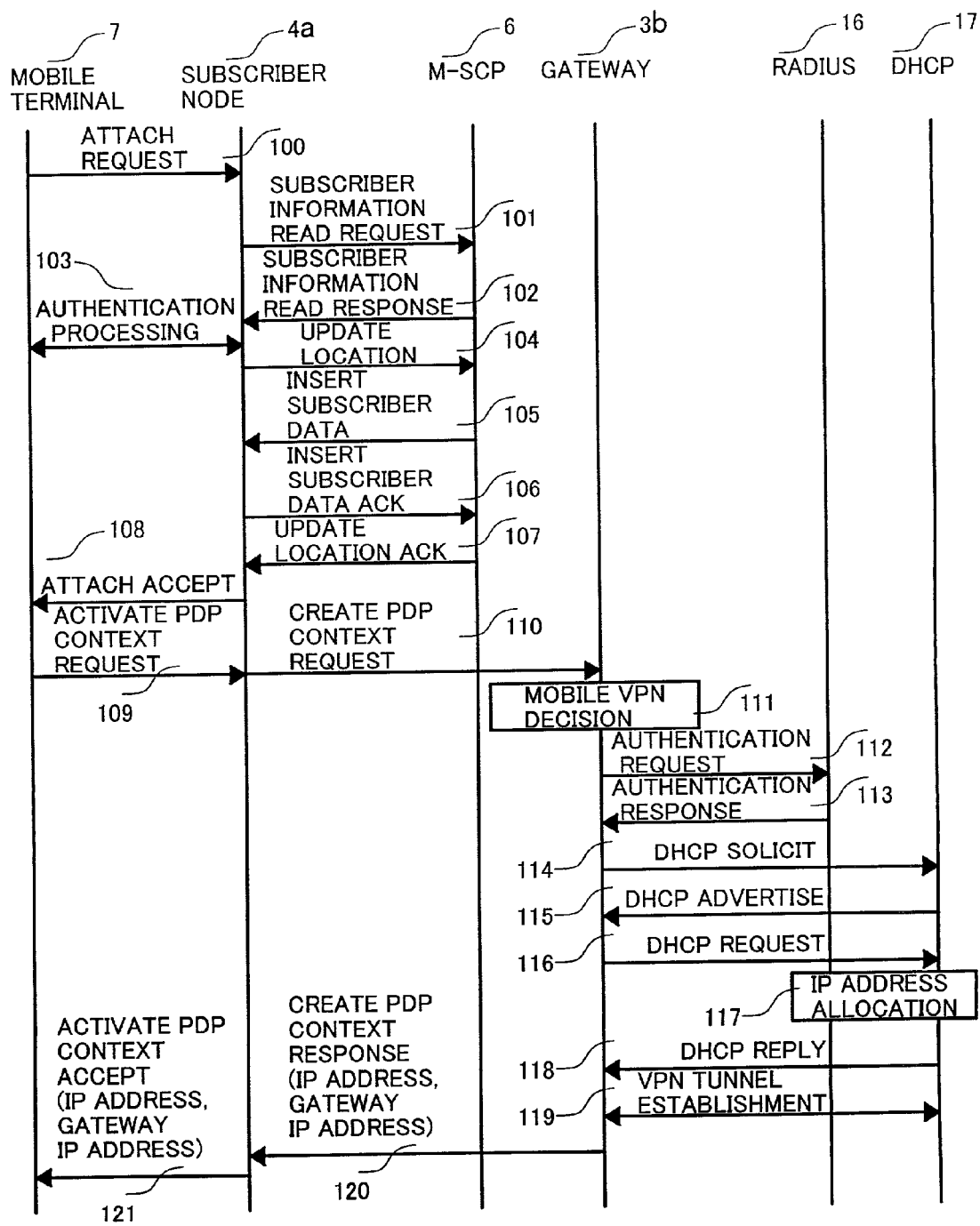
FIG. 5 is a signal sequence diagram showing a processing procedure to be taken for origination from a terminal according to the present invention.
Figure 6:
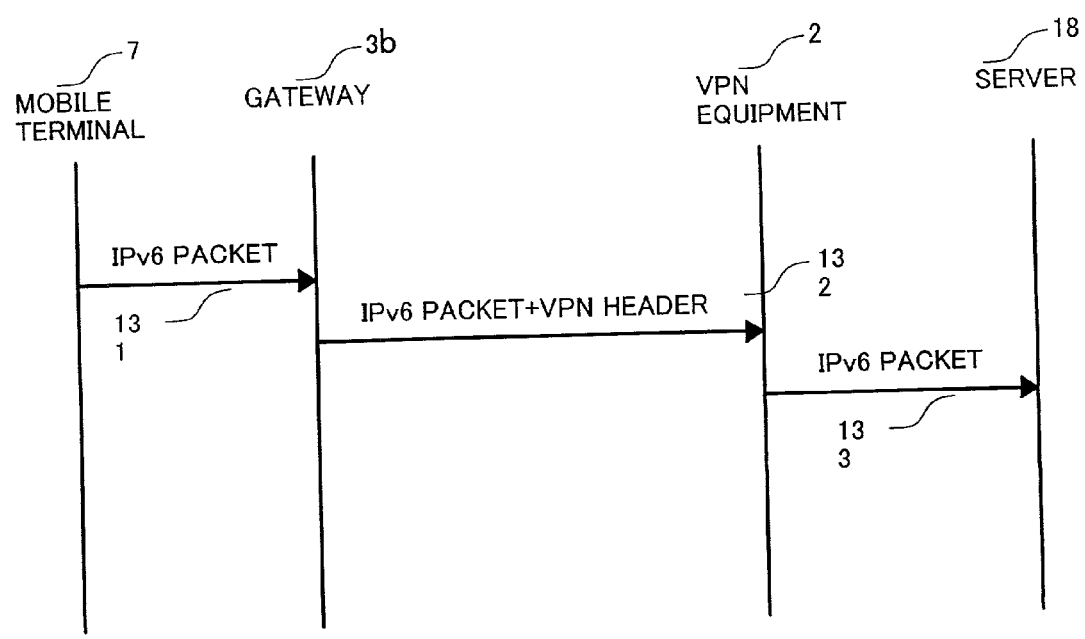
FIG. 6 is a signal sequence diagram showing a communication processing procedure according to the present invention.

Then, with particular reference to FIGS. 5 and 6 showing signal sequences, the following describes processing procedures for providing mobile VPN service in the network illustrated in FIG. 1.

Referring to FIG. 5, there is shown a processing procedure to be taken when a user of the mobile terminal 7 subscribing to the mobile packet communication network 12 starts the use of mobile VPN service.

Demonstrated below is a preferred embodiment of the present invention wherein GPRS-based control signals are used in the mobile packet communication network.

First, the mobile terminal 7 registers its current location information in the mobile packet communication network.

Then, the mobile terminal 7 sends a message "Attach Request" 100 including its mobile packet communication network subscriber identifier (IMSI) to the subscriber node 4a. Upon receipt of this message 100, the subscriber node 4a determines an M-SCP 6 to be used for holding subscriber information according to the IMSI included in the message 100 and sends a subscriber information read request message 101 including the IMSI to the M-SCP 6.

Then, according to the IMSI included in the message 101, the M-SCP 6 reads out authentication information regarding the IMSI, and sends a subscriber information read response message 102 including the authentication information to the subscriber node 4a.

Upon receipt of the subscriber information read response message 102, the subscriber node 4a carries out authentication processing in communication with the mobile terminal 7 (103).

If the authentication processing comes to a normal end, the subscriber node 4a sends a message "Update Location" 104 including its own IP, address to the M-SCP 6.

When the M-SCP 6 receives the message 104, the M-SCP 6 stores the IP address of the subscriber node 4a as location information relevant to the IMSI. Then, the M-SCP 6 sends a message "Insert Subscriber Data" 105 including subscription agreement information to the subscriber node 4a. The subscriber node 4a stores the information of the message 105, and then sends a message "Insert Subscriber Data Ack" 106 to the M-SCP 6. Upon receiving the message 106, the M-SCP 6 sends a message "Update Location Ack" 107 indicating the end of location information registration to the subscriber node 4a. When the subscriber node 4a receives the message 107, the subscriber node 4a sends a message "Attach Accept" 108 to the mobile terminal 7.

Where a destination of connection from the mobile terminal 7 is registered as a fixed point, an APN is contained in the subscription agreement information in the message 105.

Then, the mobile terminal 7 carries out a processing operation for enabling packet transmission and reception. The mobile terminal 7 sends a message "Activate PDP Context Request" 109 including the IMSI to the subscriber node 4a.

Where a destination of connection from the mobile terminal 7 is variable, an APN input by a user of the mobile terminal 7 is contained in the message 109.

According to the APN, the subscriber node 4a identifies a gateway node. After this identification, the subscriber node 4a sends a message "Create PDP Context Request" 110 including the APN to the gateway node 3b. The APN included in the message 110 received by the gateway node 3b is used for identifying a communication network corresponding to the current communication request or equipment thereon.

At the gateway node 3b, a subscriber node IP address contained in the received message 110 is stored into the subscriber node IP address field 303 for the IMSI concerned in the user information management table 300 shown in FIG. 4. Then, the gateway node 3b starts the VPN decision processing routine 60 shown in FIG. 3 for checking whether mobile VPN service is requested or not (111).

If it is found that mobile VPN service is requested, the gateway node 3b sets the VPN flag 304 for the IMSI concerned in the user information management table 300. Then, for judging whether VPN service access is allowed or not, the gateway node 3b sends an authentication request 112 to the RADIUS server 16 connected with the LAN 14. If the result of authentication is successful, the RADIUS server 16 returns an authentication response 113 indicating the successful authentication result to the gateway node 3b.

If no IP address is allocated to the mobile terminal 7, an IP address allocation procedure is indicated to the mobile terminal 7. For IP address allocation, the IPv6-compatible DHCP is used, for example.

The gateway node 3b sends a control signal for detecting a DHCP server having an IP addressing function (DHCP Solicit) 114 to the LAN 14. Upon receipt of the control signal 114, the DHCP server 17 sends a response signal (DHCP Advertise) 115 including its own address information to the gateway node 3b. Then, the gateway node 3b sends an IP address allocation request signal (DHCP Request) 116 to the DHCP server 17. When receiving the IP address request signal 116, the DHCP server 17 allocates an IP address to the mobile terminal 7 (117), and then the DHCP server 17 sends a response signal (DHCP Reply) 118 including the allocated IP address to the gateway node 3b. At the gateway node 3b, the allocated IP address is written into the IP address field 302 for the IMSI concerned in the user information management table 300 shown in FIG. 4.

Then, the gateway node 3b sets up a VPN tunnel between the gateway node 3b and the VPN equipment 2 (119). After establishment of this VPN tunnel, the subscriber node 3b registers a VPN tunnel identifier and a VPN session identifier for the user concerned in the VPN tunnel identifier field 305 and the VPN session identifier field 306 of the user information management table 300 shown in FIG. 4.

From the gateway node 3b, a message "Create PDP Context Response" 120 including its own IP address and the above IP address allocated to the mobile terminal 7 is sent to the subscriber node 4a. When the subscriber node 4a receives the message 120 including the IP address of the gateway node 3b and the IP address allocated to the mobile terminal 7, a message "Activate PDP Context Accept" 121 including the IP address of the gateway node 3b and the IP address allocated to the mobile terminal 7 is sent from the subscriber node 4 to the mobile terminal 7.

The mobile terminal 7 stores the IP address of the gateway node 3b included in the message 121 for using the IP address of the gateway node 3b in IPv6 packet communication.

If a mobile VPN service request is not detected at step 111, the gateway node 3b sends a message "Create PDP Context Response" 120 not including its own IP address to the subscriber node 4a. Then, the subscriber node 4a sends a message "Activate PDP Context Accept" 121 not including the IP address of the gateway node 3b to the mobile terminal 7.

Referring to FIG. 6, there is shown a processing procedure to be taken for packet data transmission from the mobile terminal 7 after completion of the processing procedure shown in FIG. 5. The following describes a case where the mobile terminal 7 has received the IP address information of the gateway node 3b from the subscriber node 4a.

Using the IPv6 routing header indicated in FIG. 7, the mobile terminal 7 sends IPv6 packet data. For packet transmission, the mobile terminal 7 makes settings in an IPv6 packet 131 as mentioned below. The IP address of the gateway node 3b is set in the destination address field 213 of the IPv6 header 210. The IP address of the mobile terminal 7 is set in the source address field 212 of the IPv6 header 210. A value of "43" indicating the presence of a subsequent routing header is set in the next header field 211 of the IPv6 header 210. Besides, an IP address of the server 18 in the LAN 14 is set in the address field 222 of the IPv6 routing header 220, and "1" is set in the segment left field 221 thereof.

Upon receipt of the IPv6 packet 131, the gateway node 3b carries out IPv6 routing header processing. More specifically, the IP address of the server 18 is set in the destination address field 213 of the IPv6 header 210, the IP address of the gateway node 3b is set in the address field 222 of the IPv6 routing header 220, and "1" in the segment left field 221 of the IPv6 routing header 220 is changed to "0".

From a network prefix indicated in the IP address of the server 18, the gateway node 3b judges that mobile VPN service is available. Then, the gateway node 3b identifies an IP address of the VPN equipment 2. The IP address of the VPN equipment 2 is set as a destination address in the IP header 241 contained in the VPN tunneling header 240 shown in FIG. 8.

Using information contained in the source address field 212 of the IPv6 header 210 in the received IPv6 packet 131 as a search key, the gateway node 3b reads a VPN tunnel identifier 305 of the mobile terminal 7 and a VPN session identifier 306 thereof out of the user information management table 300. The VPN tunnel identifier 305 and the VPN session identifier 306 are set in the L2TP header 243 contained in the VPN tunneling header 240.

The gateway node 3b adds the VPN tunneling header 240 to the received IPv6 packet 131 to produce a packet 132. The packet 132 thus produced is sent to the VPN equipment 2.

When the VPN equipment 2 receives the packet 132 having the VPN tunneling header 240, the VPN equipment 2 removes the VPN tunneling header 240 from the packet 132 to attain an IP packet 133 corresponding to the original packet. The IP packet 133 thus attained is transferred to the server 18 according to the destination IP address contained therein.

In the above-mentioned processing, IP packet data addressed from the mobile terminal 7 to the server 18 is unexceptionally transferred through the gateway node 3b at which the VPN tunnel for the mobile terminal 7 has been set up. In the IPv6 mobile packet communication network, it is therefore possible to provide mobile VPN service without having to use a mobile tunnel.

Then, the following describes a case where the mobile terminal 7 has not received the IP address information of the gateway node 3b from the subscriber node 4a.

For packet transmission, the mobile terminal 7 makes settings in an IPv6 packet 131 as mentioned below.

The IP address of the server 18 in the LAN 14 is set in the destination address field 213 of the IPv6 header 210. An upper-layer protocol number (e.g., "6" if TCP is used as an upper-layer protocol) is set in the next header field 211 of the IPv6 header 210. The IPv6 packet 131 comprises the IPv6 header 210 and the payload 230, i.e., the routing header 220 is not contained in the IPv6 packet 131. Therefore, since the mobile terminal 7 does not specify a transfer route for packet transmission, packet data is not always transferred through the gateway node 3b. Where the mobile terminal 7 does not use mobile VPN service, packet data from the mobile terminal 7 is transferred according to routing table information held in respective nodes.

As set forth hereinabove and according to the present invention, there is provided an IPv6 mobile packet communication network in which an IPv6 routing header is used to specify that IP packet data from a mobile terminal is to be unexceptionally transferred through a particular gateway node. It is therefore possible to provide mobile VPN service without having to use a mobile tunnel. Furthermore, efficient communication service can be provided by making use of IPv6 functions.

The foregoing invention has been described in terms of preferred embodiments. However, those skilled, in the art will recognize that many variations of such embodiments exist. Such variations are intended to be within the scope of the present invention and the appended claims.

What is claimed is:

1. In a packet communication network including terminal equipment, subscriber equipment, and a gateway having means for communicating with said subscriber equipment and another communication network, a packet communication control method comprising:

providing said subscriber equipment and said gateway with means for communicating with service control equipment in which location information and service information regarding each subscriber terminal are stored;

providing said gateway with means for communicating with enterprise network equipment over another communication network;

allowing said terminal equipment to send a control signal to said gateway via said subscriber equipment for enabling information interchange with equipment on said packet communication network or another communication network;

providing said gateway with first service control means for detecting a request for communication with said enterprise network equipment from destination-of-connection information included in said control signal received from said subscriber equipment;

providing an arrangement wherein, upon detection of said request for communication with said enterprise network equipment, said gateway sends a control signal including address information of said gateway to said subscriber equipment;

providing said subscriber equipment with second service control means for sending said control signal including address information of said gateway to said terminal equipment; and providing said terminal equipment with third service control means for assembling an IPv6 packet in a manner that, when said terminal equipment receives said control signal including address information of said gateway, said address information of said gateway is used in creation of IPv6 header information in order for packet data from said terminal equipment to be unexceptionally transferred through said gateway; and whereby, in transmission from said terminal equipment to said enterprise network equipment, packet data is unexceptionally transferred through said gateway.

2. A packet communication control method as claimed in claim 1, wherein, upon receipt of said control signal including address information of said gateway from said subscriber equipment, said terminal equipment creates an IPv6 header and an IPv6 routing header using said address information of said gateway, and wherein, at said terminal equipment, each packet to be sent from said terminal equipment is so assembled as to be unexceptionally transferred through said gateway, whereby, in transmission from said terminal equipment to said enterprise network equipment, packet data is unexceptionally transferred through said gateway.

3. A packet communication control method as claimed in claim 1, wherein information to be used by said gateway for identifying a destination of connection is provided in a procedure in which said subscriber equipment reads destination-of-connection information for said terminal equipment out of subscriber information regarding said terminal equipment, said subscriber information being stored in said service control equipment, and said destination-of-connection information is set in a control signal directed to said gateway, or in a procedure in which destination-of-connection information input in said terminal equipment by a user thereof is set in a control signal directed to said subscriber equipment, and upon receiving said control signal, said subscriber equipment sets said destination-of-connection information in a control signal directed to said gateway.

4. In a packet communication network including terminal equipment, subscriber equipment and a gateway having means for communicating with said subscriber equipment and another communication network, a packet communication control method comprising:

providing said subscriber equipment and said gateway with means for communicating with service control equipment in which location information and service information regarding each subscriber terminal are stored;

providing said gateway with means for communicating with enterprise network equipment over another communication network;

allowing said terminal equipment to send a control signal to said gateway via said subscriber equipment for enabling information interchange with equipment on said packet communication network or another communication network;

providing an arrangement wherein destination-of-connection information input by a user or destination-of-connection information read out of said service control equipment is unexceptionally included in said control signal from said subscriber equipment to said gateway;

providing said gateway with first service control means for detecting a request for communication with said enterprise network equipment from said destination-of-connection information included in said control signal received from said subscriber equipment;

providing an arrangement wherein, when said first service control means of said gateway detects said request for communication with said enterprise network equipment, said gateway sends a control signal including address information of said gateway to said subscriber equipment;

providing said subscriber equipment with second service control means for sending said control signal including address information of said gateway to said terminal equipment;

providing an arrangement wherein, when said terminal equipment receives said control signal including address information of said gateway, said terminal equipment creates an IPv6 header and an IPv6 routing header using said address information of said gateway;

providing said terminal equipment with third service control means for assembling a packet in order for packet data from said terminal equipment to be unexceptionally transferred through said gateway;

providing an arrangement wherein, when said first service control means of said gateway does not detect said request for communication with said enterprise network equipment, said gateway sends a control signal not including address information of said gateway to said subscriber equipment, and then said subscriber equipment sends said control signal not including address information of said gateway to said terminal equipment; and allowing said terminal equipment to send an ordinary IPv6 packet to a destination of connection when address information of said gateway is not included in a control signal received by said terminal equipment;

whereby, in transmission from said terminal equipment to said enterprise network equipment, packet data is unexceptionally transferred through said gateway, and whereby, when said terminal equipment sends an ordinary IPv6 packet to a destination of connection, said ordinary IPv6 packet is optimally routed to said destination of connection according to routing table information held in each node equipment.

5. A gateway which is connected to a packet communication network, which is provided with means for communicating with subscriber equipment, equipment on another packet communication network, and equipment on another communication network, and which is provided with means for communicating with service control equipment in which location information and service information regarding each subscriber terminal are stored, said gateway comprising:

means for communicating with enterprise network equipment over another communication network; and service control means for receiving from said subscriber equipment a control signal for enabling packet data communication with a mobile terminal and for detecting a request for communication with said enterprise network equipment from destination-of-connection information included in said control signal, wherein, when said service control means of said gateway detects said request for communication with said enterprise network equipment, said gateway sends a control signal including identification information of said gateway to said subscriber equipment.

6. Subscriber equipment which is connected to a packet communication network, which is provided with means for communicating with terminal equipment, a gateway having means for communication with another communication network and another equipment in said packet communication network, and which is provided with means for communicating with service control equipment in which location information and service information regarding each subscriber terminal are stored, said subscriber equipment comprising:

means for allowing said gateway to communicate with enterprise network equipment over another communication network; and service control means for sending a control signal to said terminal equipment;

wherein, before starting information interchange with equipment on said packet communication network or equipment on another communication network, said terminal equipment sends a control signal for enabling packet data communication to said gateway in a predetermined procedure, wherein, upon receipt of said control signal from said terminal equipment, said gateway detects a request for communication with said enterprise network equipment from said control signal, and wherein, when a control signal including identification information of said gateway is received from said gateway, said subscriber equipment sends said control signal including identification information of said gateway to said terminal equipment.

7. Terminal equipment comprising:

means for communicating with subscriber equipment; and service control means for assembling packet data;

wherein said subscriber equipment, connected to a packet communication network, is provided with means for communicating with a gateway on said packet communication network and means for communicating with service control equipment in which location information and service information regarding each subscriber terminal are stored, wherein, before starting information interchange with equipment on said packet communication network or equipment on another communication network, said terminal equipment sends a control signal for enabling packet data communication to said gateway in a predetermined procedure, wherein, upon receipt of said control signal from said terminal equipment, said gateway detects a request for communication with enterprise network equipment from said control signal, wherein said gateway sends a control signal including identification information of said gateway to said subscriber equipment, and wherein, when said terminal equipment receives said control signal including identification information of said gateway from said subscriber equipment, said terminal equipment performs packet assembly using said identification information of said gateway so that packet data from said terminal equipment will be transferred through said gateway.

* * * * *